Dec. 1, 1936.  J. O. HEINZE  2,062,574
PNEUMATIC LOAD CARRYING DEVICE
Filed April 10, 1935   2 Sheets-Sheet 1
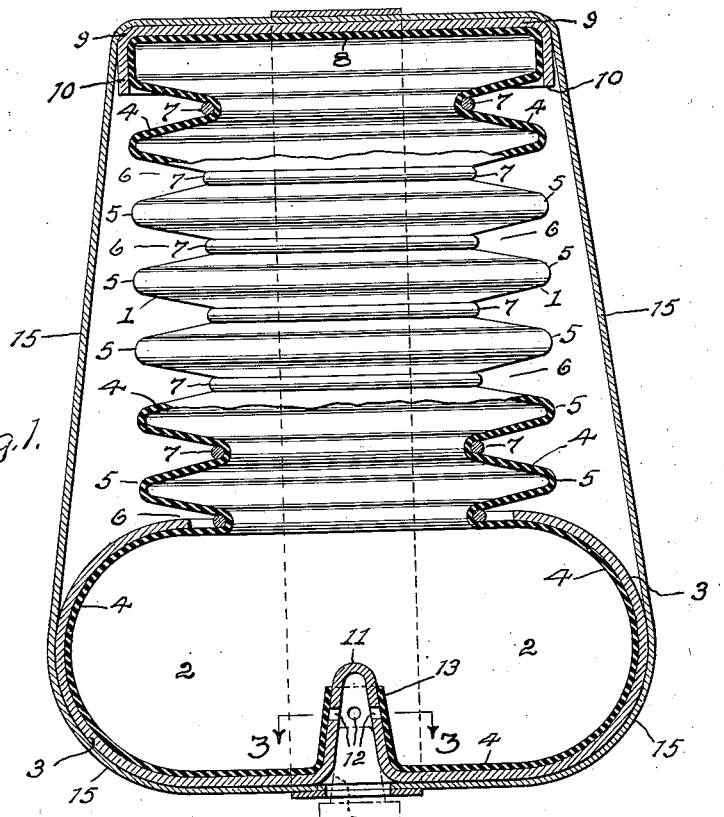
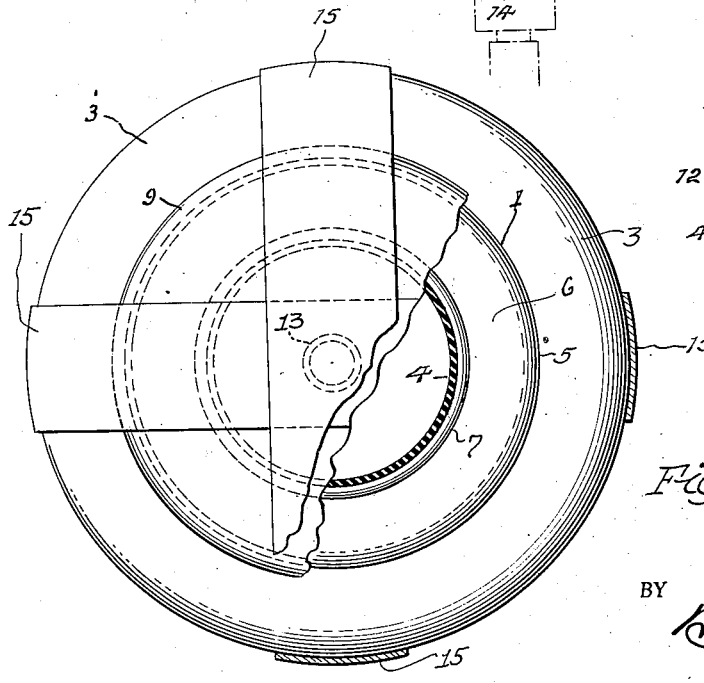
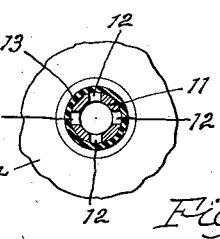
INVENTOR.
John O. Heinze,
BY
ATTORNEYS Dec. 1, 1936.   J. O. HEINZE   2,062,574
PNEUMATIC LOAD CARRYING DEVICE
Filed April 10, 1935   2 Sheets-Sheet 2
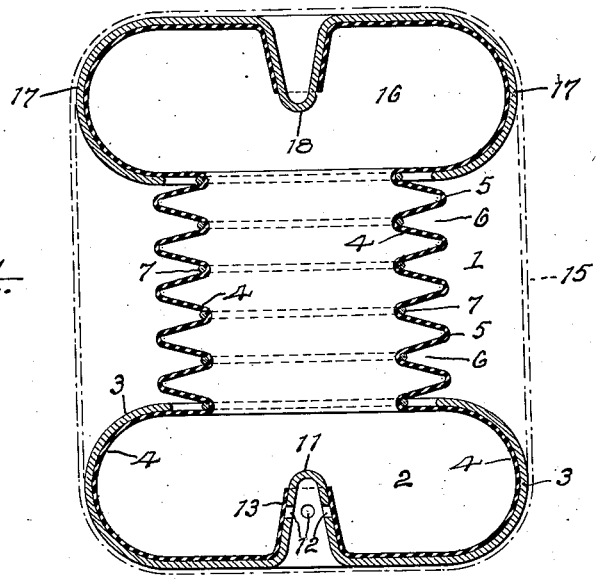
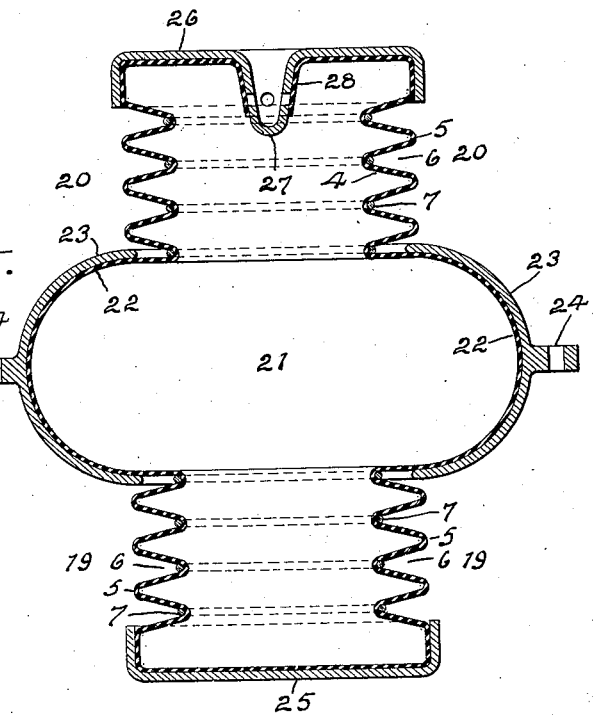
INVENTOR.
John O. Heinze,
BY
ATTORNEYS Patented Dec. 1, 1936

2,062,574

UNITED STATES PATENT OFFICE 2,062,574

PNEUMATIC LOAD CARRYING DEVICE

John O. Heinze, Detroit, Mich., assignor to Heinze Development Co., Detroit, Mich., a corporation of Michigan Application April 10, 1935, Serial No. 15,661

8 Claims. (Cl. 267—35)

This invention relates to a yieldable load supporting device, and more particularly to a device for the purpose, which is of the pneumatic bellows type.

An object of the present invention is to provide a device which is a complete unit in itself and may be used individually or in multiple within a structure to provide a soft yielding action under light loads and to offer yielding resistance sufficient to support the maximum load for which the device is designed to carry.

A further object is to provide such a unit having a minimum over all height, by providing an auxiliary air chamber as part of the unit, to increase the volumetric capacity of the bellows, thereby increasing its range of yielding action without the necessity for increasing its length.

It is also an object to provide a complete unit construction of maximum capacity and minimum bulk, by forming such air chamber as an integral part of a bellows and by providing a metal cup or casing to receive and confine said air chamber and prevent undue expansion thereof under load, said cup or casing being also adapted to form a rigid base or support for the unit.

It is also an object to provide an air valve of simple construction as an integral part of one of the enclosing metal parts of the unit, so arranged as to greatly facilitate the inflation of said air chamber and bellows, and to provide certain other new and useful features, all as hereinafter more fully described, reference being had to the accompanying drawings wherein Fig. 1 is a substantially vertical, central, longitudinal section through a device illustrative of an embodiment of the present invention;

Fig. 2 is an end elevation with parts broken away and in section;

Fig. 3 is a sectional detail substantially upon the line 3—3 of Fig. 1;

Fig. 4 is a longitudinal section showing a modified construction; and

Fig. 5 is a similar section showing a further modification.

As shown in Fig. 1 of the drawings, I indicates as a whole, a bellows having a continuous wall of rubber or other suitable flexible material, this wall being continued from the lower end of said bellows to form an integral air chamber 2 forming the base or lower end of said bellows and into which said bellows opens centrally thereof, said chamber being of circular form with a rounded periphery to seat within a base cup or casing 3, formed preferably, of sheet metal and forming the base of the unit, said chamber being seated and confined within said casing to confine said chamber therein and prevent undue expansion thereof under load applied to the upper end of the bellows.

The flexible wall 4 of the bellows is corrugated circumferentially to provide a series of hollow ribs 5 and intermediate grooves 6, and to prevent radial expansion of these grooves, a continuous metal ring 7 preferably formed of a round wire or the like, is seated within the bottom of each groove. The bellows is thus constrained against undue expansion radially and consequent straightening out of the folds or corrugations of its wall under undue internal pressure, but is free to collapse in an endwise direction under load, the folds or corrugations of the wall being maintained and said wall being reinforced by these rings.

The wall 4 is continuous across the upper end of the bellows, forming an end wall 8 positively closing this end, and this flexible end wall is seated within a sheet metal end cap 9 having a peripheral flange 10, the upper end of the bellows being thus confined within said cap to maintain said end in desired shape against undue expansion or bulging under internal air pressure.

The wall 4 is continued at the lower end of the bellows to form the wall of the air chamber 2 with said bellows located centrally of the upper wall of said chamber and in direct open communication with said chamber, said chamber being seated within said base cup or casing 3, and thus said chamber and bellows are held in symmetrical relation and a symmetrical unit of compact cylindrical form is provided, and which unit is of minimum height due to the provision of said air chamber as an integral part thereof.

To facilitate the introduction of air under pressure into said chamber and bellows and to form a valve to hold the introduced air against escape, the bottom wall of the base cup or casing 3 is formed, centrally thereof, with an inwardly and upwardly projecting tapered teat or nipple 11, closed at its upper end and provided with one or more air holes 12 in its side wall at a distance below said closed end, and the bottom wall of said air chamber which is seated upon said bottom wall of said cup, is likewise formed with a central tubular part 13 to be sleeved over the metal nipple 11 and to cover said holes in the side wall thereof. As this tube 13 is formed of the same flexible material or rubber as the wall of the chamber, it will fit colsely against the wall of the nipple and will yield or expand when air under pressure is forced through the holes 12, and permit the air to enter the air chamber. Upon discontinuance of the forcing of air through said openings, this tubular rubber sleeve will contract, seating over and effectually sealing these holes against the escape therethrough of air from the chamber and this sealing effect is enhanced by the pressure of air in the chamber. A valvular device of very simple construction is thus provided, and as the wall of the nipple 11 is inwardly tapered, a tapered nozzle indicated at 14 in dotted lines, on the end of an air hose, may be seated within said nipple to provide a connection for introducing air under pressure into the air chamber.

To limit the expansion of the bellows so that an air pressure may be introduced therein when there is no load thereon, or expansion thereof otherwise limited, straps 15 are provided, these straps extending across the cap 9 in crossed relation, down the sides of the unit and across the bottom of the base cup 3 in like manner, each strap being just long enough to limit the upward expansion movement of the bellows to the desired extent.

With the present complete unit construction, the unit may be assembled and air under pressure introduced therein to any desired extent according to the use to which it is to be put, making the bellows easily compressible, as where a number of units are assembled in a cushion where the load is comparatively light, or inflated under heavy pressure where a heavy load is to be carried by one or more of the units, and inflation is gratly facilitatd by the arrangement of the valve nipple which forms a socket into which a tapered hose nozzle is inserted without the necessity for a threaded connection, and this nipple extends into the air chambr leaving the exterior of the cup free of projections. The rubber sleeve which is formed integral with the chamber wall, provides a very efficient closure for the holes in the nipple, the greater the air pressure the more closely the sleeve contacts the nipple, and thus a very efficient valve is provided which insures against leakage, as the sleeve is a part of the chamber wall.

By forming the bellows as part of the air chamber, the over-all length of the unit may be greatly decreased as the volumetric capacity of the bellows is, in effect, greatly increased by said chamber, and a very compact, simple construction is secured, the cup or casing 3 serving as a base or other support for the unit and enclosing means for the air chamber to limit its expansion, and this base may, if found desirable, be formed with any suitable means for securing it in place within a particular structure.

A modified construction is shown in Fig. 4, in that the bellows 1 is formed with an integral air chamber 16 at its upper end, which chamber is a duplicate of the chamber 2 at its lower end, and this upper chamber is inclosed within a sheet metal casing 17 which is substantially a duplicate of the casing 3 for the lower chamber, thus dispensing with the necessity for the cap 9, and as the two casings 3 and 17 are substantial duplicates, but one forming die is required, the only difference between the two casings being that the inwardly projecting nipple 18 of the casing 17 is devoid of the openings 12 and performs no function as an air valve in use.

A further modified construction is shown in Fig. 5 wherein the bellows structure is divided intermediate its ends to form a lower end bellows 19 forming the lower end of the unit and an upper bellows 20 forming the upper end of the unit, the adjacent open ends of these bellows 19 and 20, being connected by an intermediate air chamber 21, the wall 22 of which is a continuation of the wall of each bellows, which bellows walls are both corrugated the same as the bellows 1 and reinforced in the same way by the metal rings 7 seated in the grooves of the corrugations. A sheet metal casing 23 of ring shape and curved in cross section to conform to the exterior of the casing 21 is provided to enclose said chamber and limit the expansion thereof, and this casing may, if found desirable, be formed with outwardly projecting ears 24 as supporting or holding means therefor to support or tie the unit within a structure in which it may be assembled. The lower bellows 19 is preferably provided with an end cap 25 similar to the cap 9 and the upper end of the upper bellows 20 is provided with a cap 26 which is formed with a central inwardly extending integral nipple 27 having holes in the sides thereof and over which a tube 28 formed integral with the end wall of the bellows, is sleeved to provide a valve structure similar to that disclosed in the Figs. 1 and 4 and for the same purpose.

Obviously other changes in the construction, arrangement and combination of parts, may be made without departing from the spirit of the present invention, and I do not, therefore, wish to limit myself to the particular construction shown.

What I claim is:—

1. A device for the purpose described including a bellows having a closed end and formed at its opposite end with an air chamber of greater diameter than the diameter of said bellows and into which chamber one end of said bellows directly opens, said bellows, said end and said chamber being formed by a continuous flexible wall.

2. A device for the purpose described including a bellows having a closed end and formed at its opposite end with an integral, expansible air chamber, and a non-expansible casing to receive said air chamber and resist expansion thereof.

3. A unit device of the character described comprising a bellows, and an expansible air chamber into which one end of said bellows opens, and means encircling said chamber and forming the base of said bellows to limit expansion of said chamber under load on said bellows.

4. A unit device of the character described comprising a bellows, and an air chamber at one end of said bellows into which said end of said bellows opens, a closure for the opposite end of said bellows, and a metal casing formed to conform to the exterior of said chamber and enclose the same to resist expansion of said chamber under load applied to said bellows.

5. A device of the character described comprising a bellows having a flexible wall closing an end thereof, a metal member within which said flexible wall is seated, and a valvular device including a nipple formed integral with the wall of said member and over which nipple said flexible wall is engaged to close the same.

6. A device for the purpose described including a bellows having a flexible wall, said wall being extended to form an expansible air chamber into which an end of said bellows opens, a casing to inclose said chamber and prevent expansion of the wall thereof, and a valvular device including a nipple formed integral with the wall of said casing and over which said flexible wall of said chamber extends.

7. A device as characterized in claim 6 and wherein said nipple extends inward from the wall of said casing and is provided with a side opening, and wherein the wall of said air chamber is formed with an expansible sleeve to fit over said nipple and close said opening.

8. A unit structure for the purpose described comprising a longitudinally expansible cylindrical bellows, a non-expansible fluid chamber into which one end of said bellows directly opens, said chamber being of greater diameter than the diameter of said bellows, and a flexible strap embracing said bellows and chamber to limit expansion of said bellows longitudinally under internal fluid pressure in said chamber and bellows.

JOHN O. HEINZE.